United States Patent
Sowa et al.

(10) Patent No.: US 6,860,729 B2
(45) Date of Patent: Mar. 1, 2005

(54) COMPRESSOR HAVING MAIN AND ADJUSTABLE BALANCER PORTIONS

(75) Inventors: Masato Sowa, Kariya (JP); Yoshiyuki Nakane, Kariya (JP); Toshiro Fujii, Kariya (JP); Tatsuyuki Hoshino, Kariya (JP); Ryuta Kawaguchi, Kariya (JP); Takahiro Moroi, Kariya (JP); Tsutomu Nasuda, Kariya (JP)

(73) Assignee: Kabushiki Kaisha Toyota Jidoshokki, Tokyo (JP)

( * ) Notice: Subject to any disclaimer, the term of this patent is extended or adjusted under 35 U.S.C. 154(b) by 0 days.

(21) Appl. No.: 10/191,939

(22) Filed: Jul. 9, 2002

(65) Prior Publication Data

US 2003/0012672 A1 Jan. 16, 2003

(30) Foreign Application Priority Data

Jul. 10, 2001 (JP) .................................... P2001-209249

(51) Int. Cl.$^7$ ........................ F04C 18/04; F04C 29/00; F16C 3/20
(52) U.S. Cl. ..................... 418/151; 418/39; 418/55.1; 74/603
(58) Field of Search .................. 418/39, 55.1, 151, 418/55.3; 74/603

(56) References Cited

U.S. PATENT DOCUMENTS

| | | | |
|---|---|---|---|
| 4,649,611 A | 3/1987 | Ikeda et al. | 29/156.4 R |
| 4,838,773 A | 6/1989 | Noboru | 418/151 |
| 5,013,226 A | * 5/1991 | Nishida | 418/151 |
| 5,542,829 A | * 8/1996 | Inagaki et al. | 418/55.3 |
| 5,820,357 A | * 10/1998 | Itoh | 418/151 |
| 5,951,269 A | 9/1999 | Sasa et al. | 418/55.1 |

FOREIGN PATENT DOCUMENTS

| | | | |
|---|---|---|---|
| EP | 0855513 | 7/1998 | |
| JP | 64-8387 | * 1/1989 | 418/151 |
| JP | 02-023284 | 1/1990 | |
| JP | 04-314985 | 11/1992 | |
| JP | 07-014599 | 1/1995 | |
| JP | 10-217062 | 8/1998 | |
| JP | 2000-320478 | 11/2000 | |
| JP | 2001-032783 | 2/2001 | |

* cited by examiner

Primary Examiner—John J. Vrablik
(74) Attorney, Agent, or Firm—Knoble Yoshida & Dunleavy

(57) ABSTRACT

A compressor has a compression unit for compressing gas to a desired pressure, a drive shaft and a balancer. The drive shaft is connected to the compression unit for driving the compression unit. Imbalance on the drive shaft is generated due to movement of the compression unit. The balancer is mounted on the drive shaft and includes a main portion and adjustable portion for correcting the imbalance on the drive shaft. Preferably, at least one of the weight and the shape of the adjustable portion is adjustable.

29 Claims, 8 Drawing Sheets

US 6,860,729 B2

COMPRESSOR HAVING MAIN AND ADJUSTABLE BALANCER PORTIONS

BACKGROUND OF THE INVENTION

The present invention generally relates to compressors, and particularly to a method of and a jig for balancing the compressor.

For example, as disclosed in Japanese Unexamined Patent Publication No.4-314985, relatively small balancers cancel moment applied to a crankshaft of a scroll type compressor by shifting positions of the balancers. Thereby the scroll type compressor operates in a substantially silent and smooth manner.

Practically, since static imbalance and dynamic imbalance are generated in a compressor due to tolerance of machining and assembling, the compressor generally vibrates. As the size of the compressor becomes large, the vibration increases prominently. Therefore, it is desired to reduce the vibration from the compressor in an automobile, and especially in an electric vehicle.

SUMMARY OF THE INVENTION

The present invention addresses the above-mentioned problems originated from tolerance of machining and assembling by redressing the imbalance generated in the compressor by means of balancers.

In accordance with the present invention, a compressor has a compression unit for compressing gas to a desired pressure, a drive shaft and a balancer. The drive shaft is connected to the compression unit for driving the compression unit. Imbalance on the drive shaft is generated due to movement of the compression unit. The balancer is mounted on the drive shaft and includes a main portion and an adjustable portion for correcting the imbalance on the drive shaft.

The present invention also provides a scroll type compressor. The compressor includes a housing. A drive shaft is supported in the housing by bearings. A crankshaft is connected to the drive shaft and is offset from the central axis of the drive shaft. A fixed scroll member is formed with the housing. A movable scroll member is operatively mounted on the crankshaft and is engaged with the fixed scroll member. The compressor also includes a stator, a rotor, a counter weight, a first balancer and a second balancer. At least one of the first balancer and the second balancer includes a main portion and an adjustable portion for correcting the imbalance on the drive shaft.

The present invention also provides a method of correcting imbalance on a drive shaft of a scroll type compressor. The compressor includes a motor housing, a bearing, the drive shaft, a crankshaft, a movable scroll member, self rotation preventing mechanism with a plurality of movable pins, a counter weight, a stator, a rotor, a first balancer mounted on the drive shaft of the compressor and a second balancer mounted on the drive shaft of the compressor. At least one of the first balancer and the second balancer includes a main portion and an adjustable portion for correcting the imbalance on the drive shaft. The method includes assembling the compressor to a dummy housing having another stator, measuring the amplitude and the phase of the vibration, and correcting the imbalance on the drive shaft of the compressor based on the measured amplitude and the measured phase.

The present invention also provides a jig for correcting imbalance on a drive shaft of a scroll type compressor. The compressor includes a rotor mounted on the drive shaft, and two balancers mounted on the drive shaft. At least one of the balancers includes a main portion and an adjustable portion for correcting the imbalance on the drive shaft. The jig has a dummy housing and a stator fixed to the dummy housing. The dummy housing has two openings, each facing to one of the two balancers. The openings are used to adjust the balancers.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
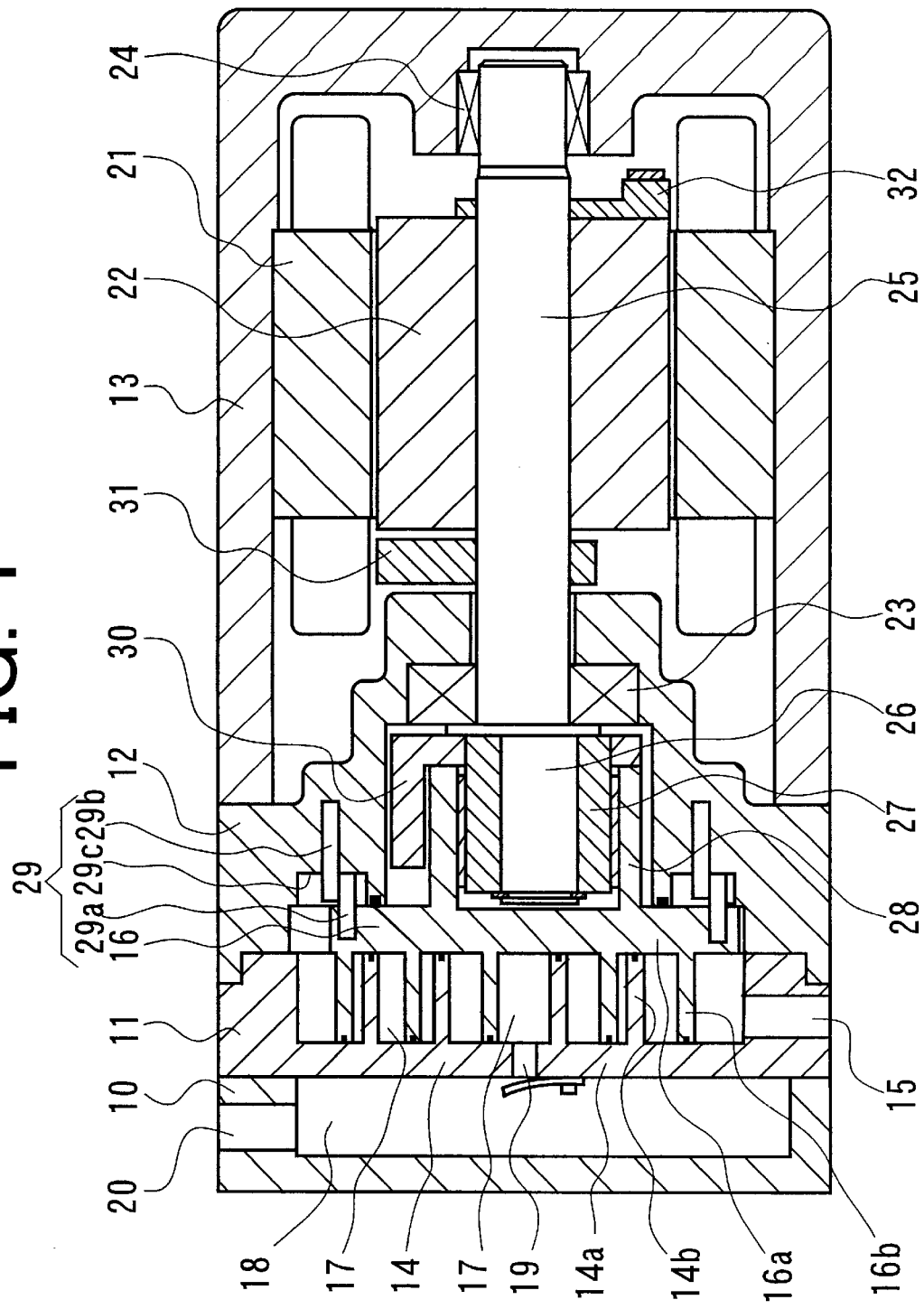
FIG. 1 is a cross-sectional view of a scroll type compressor according to a first preferred embodiment of the present invention.

Referring to FIGS. 1 to 9, a first preferred embodiment according to the present invention is utilized in a scroll type compressor for supplying air to a fuel cell will now be described. In FIG. 1, the right side and the left side respectively correspond to the front side and the rear side.

Although it is not shown in FIG. 1, a discharge housing 10, a rear housing 11, a front housing 12 and a motor housing 13 are connected through bolts to form a casing of a scroll type compressor. A fixed scroll member 14 has a fixed scroll base plate 14a and a fixed scroll wall 14b and is integrally formed with the rear housing 11. A suction port 15 introduces external gas through the rear housing 11 and is connected to an external conduit that connects with an air cleaner. A movable scroll member 16 has a movable scroll base plate 16a and a movable scroll wall 16b and is accommodated between the rear housing 11 and the front housing 12. The movable scroll wall 16b is engaged with the fixed scroll wall 14b. A plurality of compression chambers 17 is defined between the fixed scroll member 14 and the movable scroll member 16. The introduced gas is compressed in the compression chambers 17. A discharge hole 19 is formed substantially at the center of the fixed scroll base plate 14a. A discharge chamber 18 is defined between the discharge housing 10 and the rear housing 11. The compressed gas is discharged to the discharge chamber 18 through the discharge hole 19. A discharge port 20 is formed through a wall of the discharge housing 10. The compressed gas in the discharge chamber 18 is sent to a fuel cell via an external conduit.

A stator 21 is mounted on an inner wall surface of the motor housing 13. A rotor 22 is fixed around a drive shaft 25 so as to face to the stator 21. The drive shaft 25 is rotatably supported in the front housing 12 and the motor housing 13 by a first bearing 23 and a second bearing 24 along the central axes of the front housing 12 and the motor housing 13. A crankshaft 26 is connected to the rear end of the drive shaft 25 (the left side in FIG. 1) and is offset from the central axis of the drive shaft 25 in an eccentric direction. The crankshaft 26 is inserted in a bushing 27, and the bushing 27 is inserted in a boss 28 of the movable scroll member 16. A self rotation preventing mechanism 29 in the vicinity of the front side of the movable scroll member 16 includes a plurality of movable pins 29a, a plurality of fixed pins 29b and a plurality of recesses 29c. The rotation preventing mechanism 29 allows the movable scroll member 16 to orbit around the central axis of the drive shaft 25 while preventing the movable scroll member 16 from self rotating.

A counter weight 30 is mounted at a front end of the crankshaft 26 adjacent to a rear end of the drive shaft 25 so as to apply a load substantially in an opposite direction relative to the eccentric direction. A first balancer 31 is mounted on the drive shaft 25 and is positioned between the first bearing 23 and the rotor 22. The first balancer 31 applies a load substantially in the opposite direction relative to the eccentric direction. A second balancer 32 is connected to the drive shaft 25 and is positioned between the rotor 22 and the second bearing 24. The second balancer 32 applies a load substantially in the eccentric direction.

Figure 2:
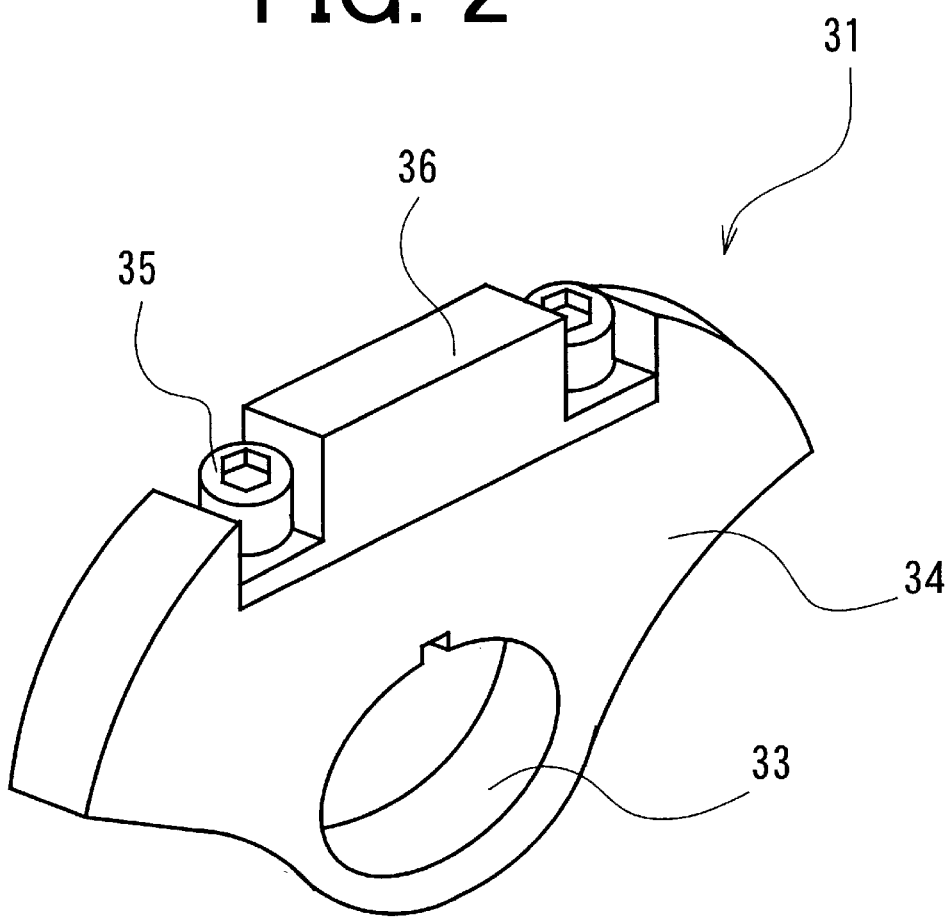
FIG. 2 is a perspective view of the first balancer according to the first preferred embodiment of the present invention.
Figure 3:
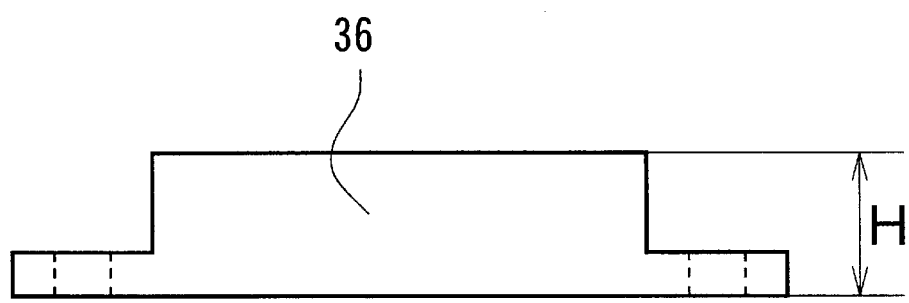
FIG. 3 is a side view of an adjustable portion of the first balancer according to the first preferred embodiment of the present invention.

As shown in FIGS. 2 and 3, the first balancer 31 can be divided. In other words, the first balancer 31 includes a substantially fan-shaped main portion 34 having a through hole 33 for fitting the drive shaft 25 and an adjustable portion 36 connected to the main portion 34 by a pair of bolts 35. FIG. 3 illustrates a side view of the adjustable portion 36. The total weight of the first balancer 31 is adjusted by choosing a suitable one from the several adjustable portions 36 with a different height H.

Figure 4:
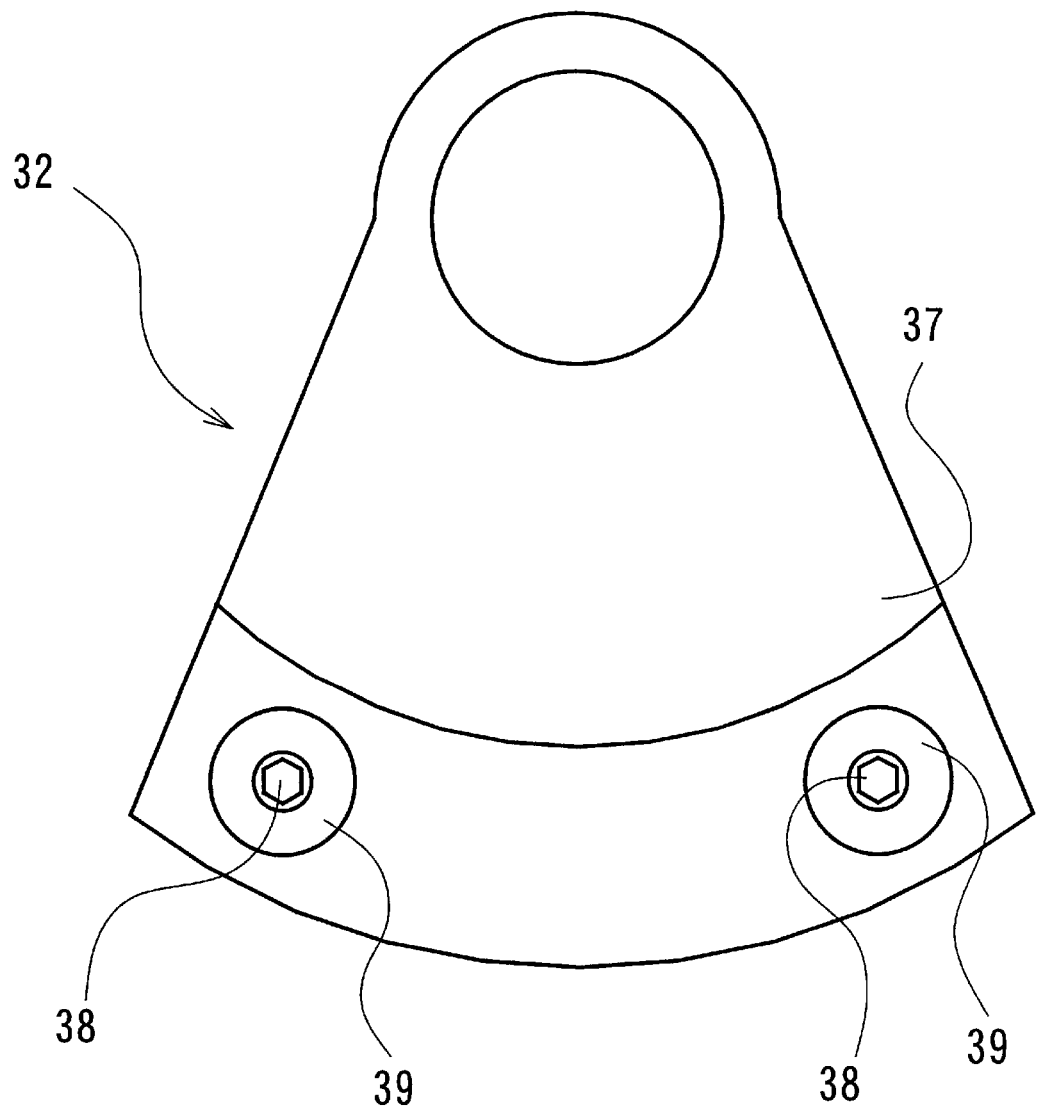
FIG. 4 is an end view of a second balancer according to the first preferred embodiment of the present invention.

Similarly, as shown in FIG. 4, the second balancer 32 includes a substantially fan-shaped main portion 37 and a pair of adjustable portions 39 connected to the main portion 37 by a pair of bolts 38. The total weight of the second balancer 32 is adjusted by choosing a suitable one from the several adjustable portions 39 with different size.

A jig for correcting imbalance on the drive shaft 25 will be described by referring to FIGS. 5 and 6. A dummy housing 42 with a stator 121 is fixed to a compressor main body 60 which includes the fixed scroll member 14, the movable scroll member 16, the rear housing 11 and the front housing 12 at the front end of the front housing 12. With respect to FIG. 6, the same reference numerals as those in FIG. 1 denote the same elements as those in FIG. 1. The common descriptions of the other elements of the main body 60 are omitted. Openings 44 and 45 are formed through the outer wall of the dummy housing 42 so as to respectively reach the first balancer 31 and the second balancer 32.

The operation of the above-constructed compressor will now be described. As the drive shaft 25 is driven by rotation of an electric motor, which includes the stator 21 and the rotor 22, the movable scroll member 16 orbits around the axis of the fixed scroll member 14. The volume of the compression chambers 17 is varied due to the orbital movement of the movable scroll member 16. Thereby, gas introduced into the compression chambers 17 from the external conduit via the suction port 15 is compressed to a predetermined pressure. The compressed gas is discharged to the discharge chamber 18 via the discharge hole 19, and then is sent to the fuel cell via the discharge port 20 and the external conduit.

Figure 7:
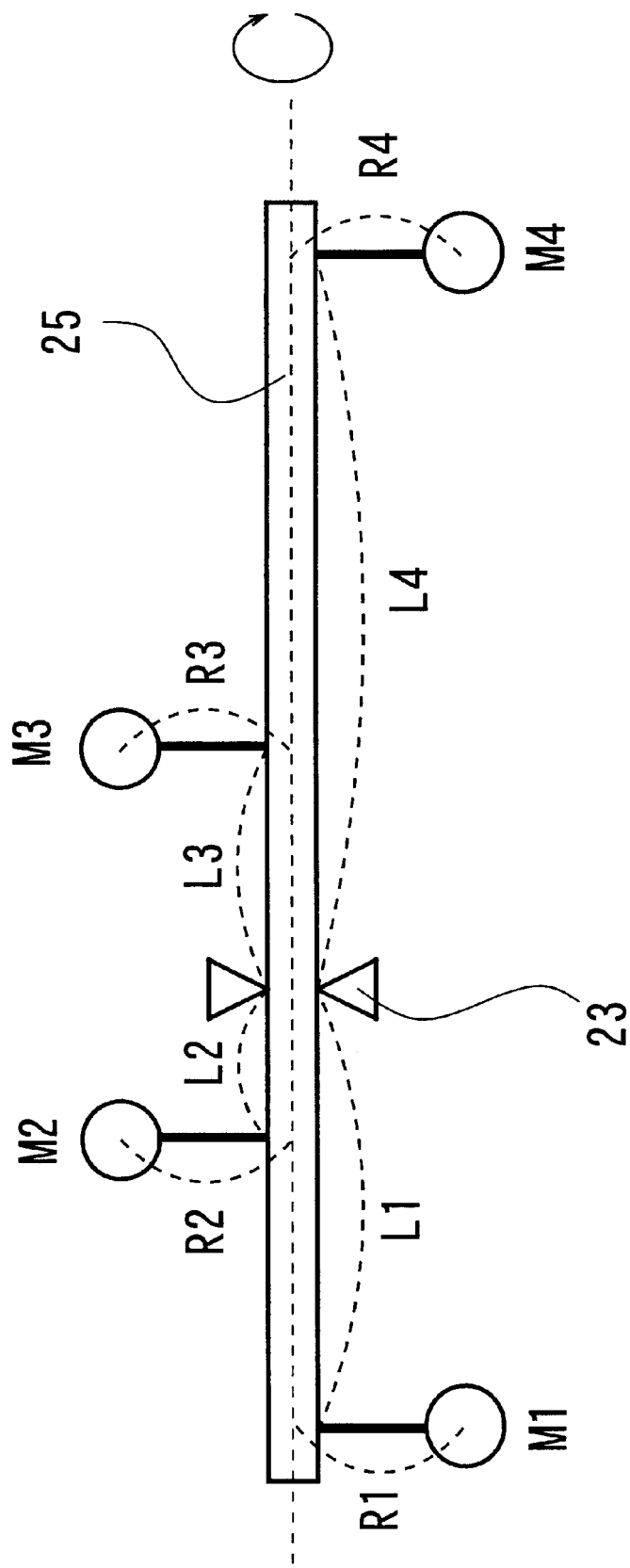
FIG. 7 is an explanatory diagram illustrating loads on the drive shaft of the first preferred embodiment according to the present invention.

A condition of loads on the drive shaft 25 of the compressor will be described by referring to FIG. 7. In FIG. 7, rotary components M1, M2, M3 and M4 are supported by the drive shaft 25 and the first bearing 23 is schematically illustrated as the center of moment as denoted by a pair of triangles. The reference marks in FIG. 7 respectively denote weight and distances as defined as follows:

M1 denotes the weight of the movable scroll member 16, a plurality of the movable pins 29a and the crankshaft 26;

M2 denotes the weight of the counter weight 30;

M3 denotes the weight of the first balancer 31;

M4 denotes the weight of the second balancer 32;

A compression unit includes M1 and M2.

R1, R2, R3 and R4 respectively denote the distances between the center of gravity of the rotary components as included in the weights M1 through M4 and the central axis of the drive shaft 25; and L1, L2, L3 and L4 respectively denote the distances between the first bearing 23 and the center of gravity of the rotary components as included in the weights M1 through M4 along the central axis of the drive shaft 25.

The static balance among the centrifugal force applied to the rotary components as included in the weights M1 through M4 is maintained based on the following equation:

$$M1 \times R1 - M2 \times R2 - M3 \times R3 + M4 \times R4 = 0 \quad (1)$$

The dynamic balance among the moments generated by the centrifugal force applied to the rotary components as included in the weights M1 through M4 is maintained based on the following equation:

$$M1 \times R1 \times L1 - M2 \times R2 \times L2 + M3 \times R3 \times L3 - M4 \times R4 \times L4 = 0 \quad (2)$$

Therefore, if the above-mentioned equations (1) and (2) were attained by adjusting the weight of each rotary component, M1 through M4, the compressor would theoretically operate without vibration. Accordingly, the first balancer and the second balancer are placed on the drive shaft substantially in accordance with the equations (1) and (2). However, since the static imbalance and the dynamic imbalance are generated on the drive shaft 25 due to tolerance of machining and assembling, the balancers actually need to be further adjusted from the calculated weight. The above-mentioned equations (1) and (2) are considered under two-dimensional condition. Furthermore, eccentric directions of the counter weight 30 or the balancers 31 and 32 may be deviated from a predetermined direction. Namely, the directions from the central axis of the drive shaft 25 to the center of gravity of the counter weight 30 or the balancers 31 and 32 may be deviated from the desired direction. If the eccentric directions of the counter weight 30 and the balancers 31 and 32 are deviated from a desired direction, the eccentric directions of the balancers also need to be corrected.

Figure 5:
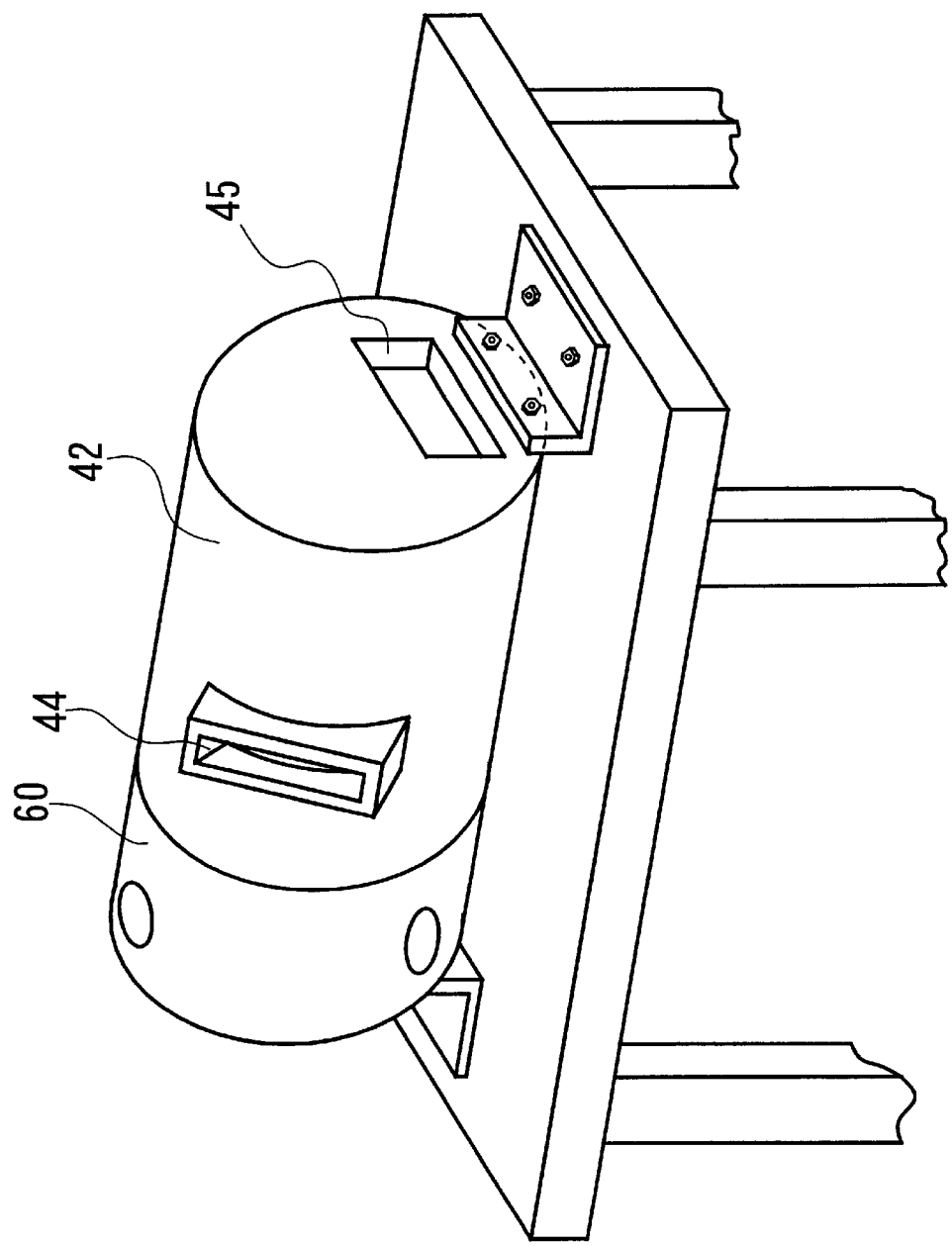
FIG. 5 is a perspective view of a jig for correcting the imbalance on the drive shaft according to the first preferred embodiment of the present invention.
Figure 6:
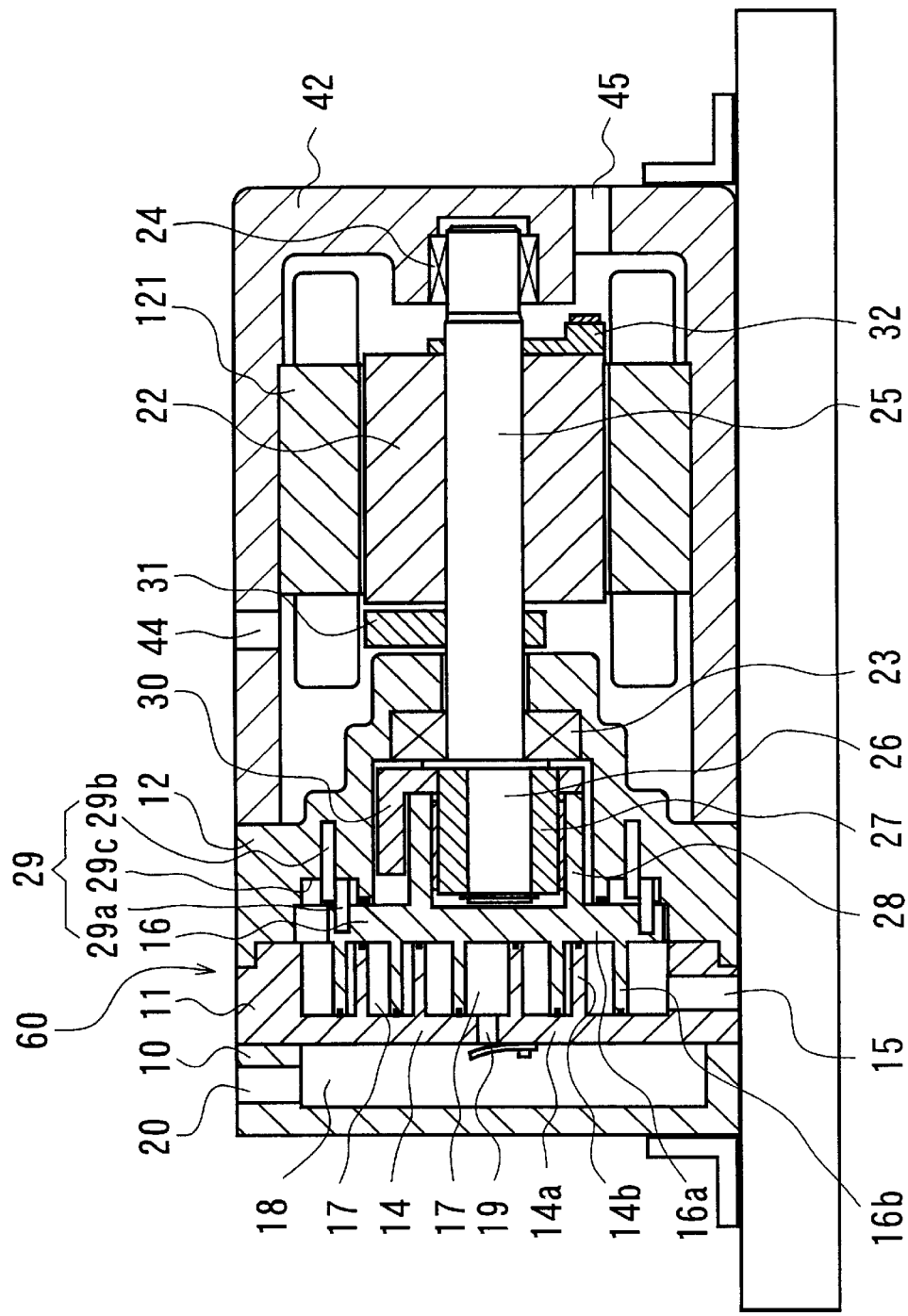
FIG. 6 is a cross-sectional view of the jig and a compressor main body according to the first preferred embodiment of the present invention.

To correct the imbalance on the drive shaft 25, a jig including the dummy housing 42 shown in FIGS. 5 and 6 is used. The compressor main body 60 of the compressor includes the drive shaft 25, the rotor 22, the bushing 27, the movable scroll member 16, the self rotation preventing mechanism 29, the counter weight 30, the first balancer 31 and the second balancer 32. The above compressor elements are assembled into an actual unit or the compressor main body 60. The assembled compressor main body 60 is fixedly placed in the dummy housing 42, which has the stator 121 on its inner surface. While the assembled compressor main body 60 operates in the dummy housing 42, the amplitude and the phase of vibration are measured by a vibrograph (not shown in the drawings). At this time, the weight and the eccentric directions of the rotary components as included in the weights M3 and M4 are accurately corrected. The correction is performed substantially in accordance with the equations (1) and (2) and based on the analysis of the data measured by the vibrograph. That is, the weight and the eccentric directions of the first balancer 31 and the second balancer 32 are accurately corrected based on the analysis of the results measured by the vibrograph. The balancers 31 and 32 are adjusted through the openings 44 and 45, which are formed through the outer circumferential wall of the dummy housing 42, while the assembled compressor main body 60 is still in the dummy housing 42.

Namely, still referring to FIGS. 5 and 6 in combination with FIGS. 2 and 3, through the opening 44, the bolts 35 are loosened, and the adjustable portion 36 is removed from the main portion 34. An appropriate adjustable portion 36 is determined based on the measured result and is selected from various types of the adjustable portions 36 with a different height H. The appropriate adjustable portion 36 is connected to the main portion 34 by the bolts 35 through the opening 44. The actual eccentric direction of the first balancer 31 deviated from the designed direction also is corrected by varying the shape of the adjustable portion 36.

Figure 8:
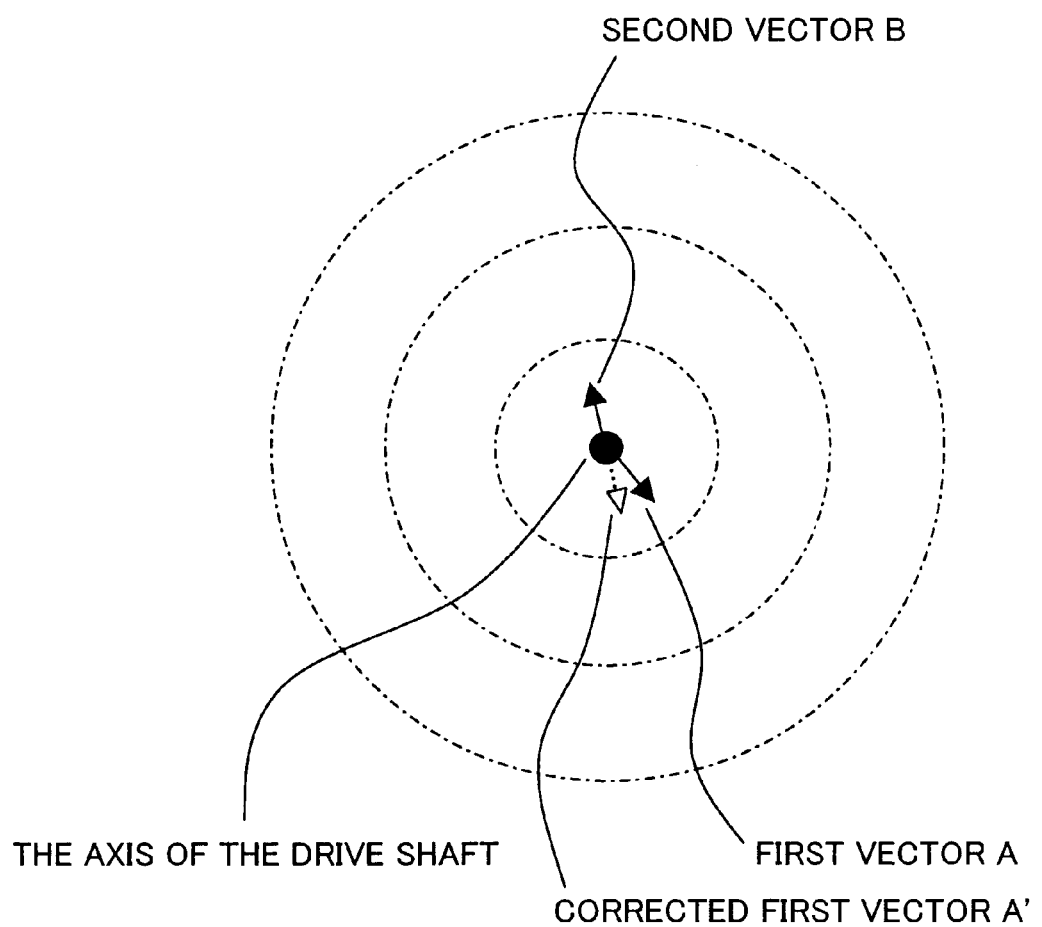
FIG. 8 is a diagram illustrating vectors of the imbalance on the drive shaft of the first preferred embodiment, viewing in an axial direction of the drive shaft according to the present invention.

For example, a diagram is obtained by analyzing the measured data of the amplitude and the phase, as shown in FIG. 8. A first vector A and a second vector B respectively indicate the vectors of the imbalance at the front side and the rear side of the drive shaft 25 relative to the first bearing 23. The shape of the adjustable portion 36 is varied by machining the adjustable portion 36 such that a corrected direction is indicated by a corrected first vector A'. The directions of the vectors B and A' become substantially the opposite directions to each other as also shown in FIG. 8.

Similarly, the second balancer 32 is accurately adjusted through the opening 45. Namely, the bolts 38 are loosened through the opening 45, and the adjustable portions 39 are removed from the main portion 37. An appropriate pair of adjustable portions 39 is determined based on the measured result and is selected from various types of the adjustable portions 39 each having different weight due to the size of diameter and thickness. The appropriate pair of adjustable portions 39 is connected to the main portion 37 by the bolts 38. Furthermore, if the eccentric direction of the second balancer 32 is deviated from the designed direction, it can be corrected by using a pair of the adjustable portions 39 each having a different weight.

As mentioned above, both the static imbalance and the dynamic imbalance on the drive shaft 25 are substantially cancelled by accurately adjusting both the first balancer 31 and the second balancer 32. The compressor main body 60 is removed from the dummy housing 42 and is assembled into the motor housing 13 for practical use.

According to the above-mentioned first preferred embodiment, following advantageous effects are obtained: (1—1) Since the balancers are divided into parts, the weight and the eccentric directions of the balancers are accurately adjusted. Therefore, the vibration of the compressor is effectively reduced. (1–2) As rotating speed increases, the vibration of the compressor generally increases. However, as both the static imbalance and the dynamic imbalance on the drive shaft of the compressor are corrected, the vibration of the compressor is substantially suppressed from increasing. (1–3) Since the imbalance on the drive shaft of the compressor is corrected in a state that all the rotary bodies or components are assembled, the vibration of the compressor is substantially reduced with relatively high accuracy. (1–4) When a relatively large-size compressor is used for supplying oxygen to a fuel cell system, even subtle tolerance of machining and assembling causes the compressor to vibrate due to its large body. When the balancers of the compressor are accurately adjusted, the above-mentioned preferred embodiment is also effective for a relatively large-size compressor.

Figure 9:
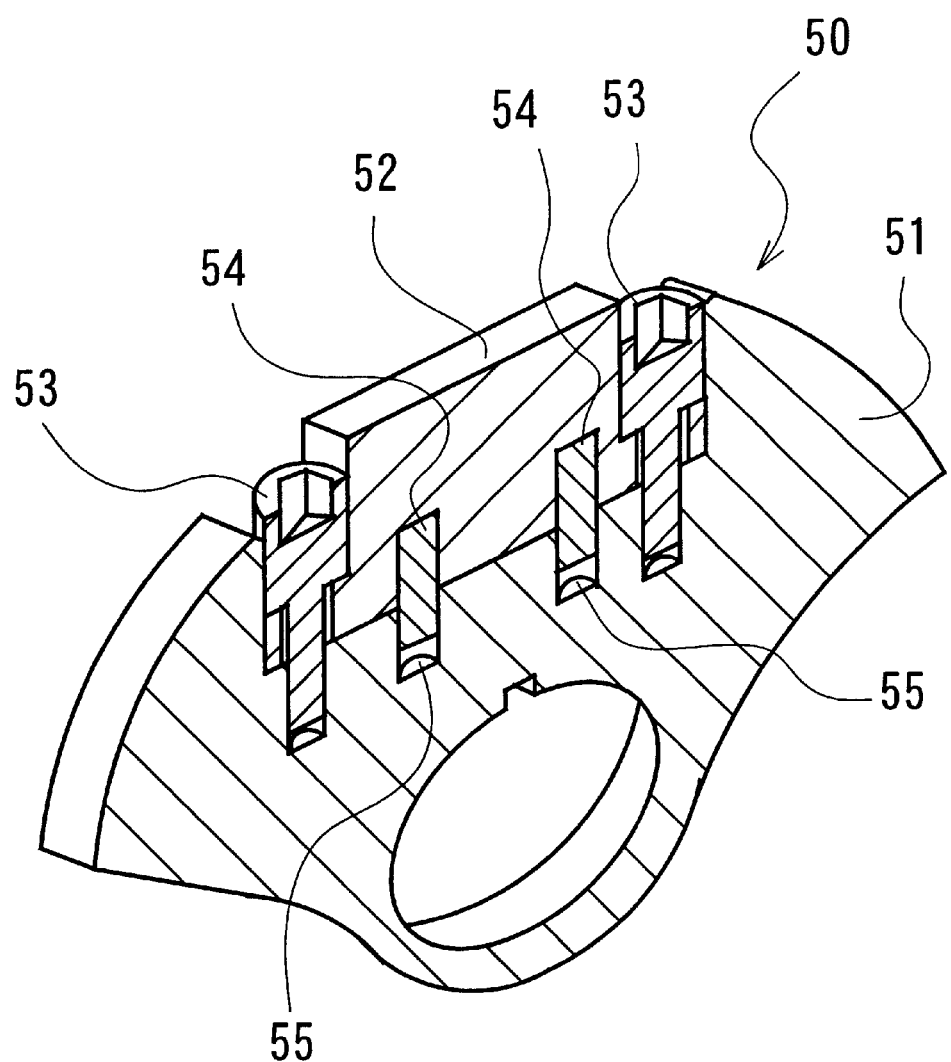
FIG. 9 is a cross-sectional perspective view of another first balancer according to a second preferred embodiment of the present invention.

A second preferred embodiment will be described by referring to FIG. 9. The structure of the first balancer 31 in the first preferred embodiment as shown in FIG. 2 is modified in the second preferred embodiment. Namely, a first balancer 50 in the second preferred embodiment includes a main portion 51, an adjustable portion 52 connected to the main portion 51 by a pair of bolts 53, and a pair of correction pins 54 placed between the main portion 51 and the adjustable portion 52. The pair of correction pins 54 is inserted in holes 55, each of which is continuously recessed in the main portion 51 and the adjustable portion 52. A plurality of correction pins 54 is prepared with a different length in advance.

To adjust the first balancer 50 in the second preferred embodiment, it is the same procedure as that in the first preferred embodiment until an appropriate adjustable portion 52 is connected to the main portion 51 When the balancer 50 needs to be more accurately adjusted, the weight of the correction pins 54 is adjusted by changing the length of the correction pins 54. At the same time, if the actual eccentric direction of the first balancer 50 is deviated from the desired direction, the eccentric direction is also adjusted by using the pair of correction pins 54 with a different length from each other so as to have the same gross weight of the correction pins 54. Also, if material of the correction pin 54 has greater specific gravity than that of the main portion 51 and the adjustable portion 52, the volume of the pair of correction pins 54 is reduced. Thereby, the length of the pair of correction pins 54 is shortened.

In the second preferred embodiment, the similar advantageous effects to the first preferred embodiment are obtained. In addition, since the balancer 50 is more accurately adjusted in the second preferred embodiment than in the first preferred embodiment, the vibration of the compressor is also more effectively reduced.

The present invention is not limited to the above-mentioned embodiments but may be modified into the following examples.

In the above-mentioned preferred embodiments, the compressor for use in a fuel cell system is employed and the suction port and the discharge port are connected to the air conduit. However, a refrigerant compressor that is connected to an external refrigerant circuit may also be employed. Similarly, in the above-mentioned preferred embodiments, the scroll type compressor is employed. However, all compressors including a rotary body also may be employed. Lastly, in the above-mentioned preferred embodiments, both the static balance and the dynamic balance are adjusted. However, when a compressor with a relatively short drive shaft is used, the dynamic imbalance is small enough for practical use and the affection of the dynamic imbalance can substantially be ignored. That is, adjusting the balance can be performed substantially in accordance with the equation (1) alone. Therefore, vibration of the compressor is substantially reduced by adjusting the only static balance.

Although a pair of cylindrical correction pins 54 is used in the above-mentioned second preferred embodiment, the number and the shape of the correction pin 54 may be changed.

Although the first balancer 31 is formed as shown in FIG. 2 and the second balancer 32 is formed as shown in FIG. 4 in the above-mentioned preferred embodiments, the first balancer 31 and the second balancer 32 may be exchanged with each other. Also the same types of the balancer shown in FIG. 2 or FIG. 4 may be used for the first balancer 31 and the second balancer 32.

Therefore, the present examples and embodiments are to be considered as illustrative and not restrictive, and the invention is not to be limited to the details given herein but may be modified within the scope of the appended claims.

What is claimed is:

1. A compressor comprising:
    a compression unit for compressing gas to a desired pressure;
    a drive shaft connected to the compression unit for driving the compression unit, imbalance on the drive shaft being generated due to movement of the compression unit; and
    a balancer mounted on the drive shaft, the balancer having a main portion and an adjustable portion for correcting the imbalance on the drive shaft, said balancer further including a correction member placed between said main portion and said adjustable portion, wherein said correction member is a pin.

2. The compressor according to claim 1, wherein the imbalance includes static imbalance due to tolerance.

3. The compressor according to claim 1, wherein the imbalance includes dynamic imbalance that is generated while driving the compression unit.

4. The compressor according to claim 1, wherein at lease one of the weight and the shape of said adjustable portion is adjustable.

5. The compressor according to claim 1, wherein said correction member has a set of predetermined shapes.

6. The compressor according to claim 1, wherein said correction member has a set of predetermined weights.

7. The compressor according to claim 1, wherein a material of said correction member has greater specific gravity than that of said main portion and said adjustable portion.

8. A scroll type compressor comprising:
    a housing;
    a drive shaft supported in the housing by a bearing, the drive shaft having a central axis and a predetermined end;
    a crankshaft connected to the predetermined end of the drive shaft, the crankshaft being offset in an eccentric direction from the central axis of the drive shaft;
    a fixed scroll member fixed to the housing and having a fixed scroll base plate and a fixed scroll wall;
    a movable scroll member operatively mounted on the crankshaft, the movable scroll member engaging with the fixed scroll member, the movable scroll member having a movable scroll base plate and a movable scroll wall;
    a counter weight mounted on the drive shaft so as to apply a load substantially in an opposite direction relative to the eccentric direction;
    a first balancer mounted on the drive shaft so as to apply a load substantially in the opposite direction; and
    a second balancer mounted on the drive shaft so as to apply a load substantially in the eccentric direction; and
    wherein at least one of said first balancer and said second balancer includes a main portion and at least one adjustable portion, the weight and the shape of said adjustable portion being adjustable for correcting imbalance among the load applied to the drive shaft, a plurality of holes being formed in said main portion, at least one hole being formed in said adjustable portion, said adjustable portion being connected to said main portion by a bolt through said at least one hole of said adjustable portion and at least one of the plurality of holes of said main portion.

9. The scroll type compressor according to claim 8, wherein said first balancer is placed at an opposite side of the crankshaft relative to the bearing.

10. The scroll type compressor according to claim 8, wherein said second balancer is placed at an opposite side of the crankshaft relative to the bearing.

11. The scroll type compressor according to claim 8, wherein said first balancer is closer to the bearing than said second balancer.

12. The scroll type compressor according to claim 8, wherein at least one of the weight and the shape of said adjustable portion is adjustable.

13. The compressor according to claim 8, wherein said adjustable portion has a plurality of sub-portions, the sub-portions each having a unique shape.

14. The compressor according to claim 8, wherein said adjustable portion has a pair of asymmetrical sub-portions.

15. The scroll type compressor according to claim 8, further comprising a self rotation preventing mechanism with a plurality of movable pins, which allows the movable scroll member to orbit around the central axis of the drive shaft and prevents the movable member from self rotating, wherein said first balancer and said second balancer are placed on the drive shaft substantially in accordance with the following equation:

$$M1 \times R1 - M2 \times R2 - M3 \times R3 + M4 \times R4 = 0,$$

wherein M1 denotes the weight of the movable scroll member, a plurality of the movable pins and the crankshaft, M2 denotes the weight of the counter weight, M3 denotes the weight of the first balancer and M4 denotes the weight of the second balancer, and R1, R2, R3 and R4 respectively denote the distances between the center of gravity of the rotary components as included in the weights M1 through M4 and the central axis of the drive shaft.

16. The scroll type compressor according to claim 15, wherein said first balancer and said second balancer are placed on the drive shaft substantially in accordance with the following equation:

$$M1 \times R1 \times L1 - M2 \times R2 \times L2 + M3 \times R3 \times L3 - M4 \times R4 \times L4 = 0,$$

wherein L1, L2, L3 and L4 respectively denote the distances between the first bearing and the center of gravity of the rotary components as included in the weights M1 through M4 along the central axis of the drive shaft.

17. The scroll type compressor according to claim 8, wherein at least one of said first balancer and said second balancer has a correction member between said main portion and said adjustable portion.

18. The scroll type compressor according to claim 17, wherein said correction members has a set of predetermined shapes.

19. The scroll type compressor according to claim 17, wherein said correction member has a set of predetermined weights.

20. The scroll type compressor according to claim 17, wherein a material of said correction member has a greater specific gravity than that of said main portion and said adjustable portion.

21. The scroll type compressor according to claim 17, wherein said correction member is a pin.

22. A compressor comprising:
    a compression unit for compressing gas to a desired pressure;
    a drive shaft connected to the compression unit for driving the compression unit, imbalance on the drive shaft being generated due to movement of the compression unit;
    a balancer mounted on the drive shaft, the balancer having a main portion and an adjustable portion for correcting the imbalance on the drive shaft; and
    a correction member placed between said main portion and said adjustable portion, a material of said correction member has a greater specific gravity than that of said main portion and said adjustable portion.

23. A compressor comprising:
    a compression unit for compressing gas to a desired pressure;
    a drive shaft connected to the compression unit for driving the compression unit, imbalance on the drive shaft being generated due to movement of the compression unit; and
    a balancer mounted on said drive shaft for correcting the imbalance on the drive shaft, said balancer further comprises a main portion and an adjustable portion, said main portion and said adjustable portion forming an internal area for receiving a correction member.

24. The compressor according to claim 23, wherein the imbalance includes static imbalance due to tolerance.

25. The compressor according to claim 23, wherein the imbalance includes dynamic imbalance that is generated while driving the compression unit.

26. The compressor according to claim 23, wherein the correction member has a set of predetermined shapes.

27. The compressor according to claim 23, wherein the correction member has a set of predetermined weights.

28. The compressor according to claim 23, wherein at lease one of the weight and the shape of said adjustable portion is adjustable.

29. The compressor according to claim 23, wherein a material of the correction member has greater specific gravity than that of said main portion and said adjustable portion.

* * * * *

UNITED STATES PATENT AND TRADEMARK OFFICE
CERTIFICATE OF CORRECTION

PATENT NO. : 6,860,729 B2 Page 1 of 1
APPLICATION NO. : 10/191939
DATED : March 1, 2005
INVENTOR(S) : Masato Sowa et al.

It is certified that error appears in the above-identified patent and that said Letters Patent is hereby corrected as shown below:

On the Title page, Item (73), please change the Assignee's residence to --Aichi-ken (JP)--.

Signed and Sealed this

Seventeenth Day of July, 2007

JON W. DUDAS
*Director of the United States Patent and Trademark Office*